(12) United States Patent
Kennedy et al.

(10) Patent No.: US 6,453,669 B2
(45) Date of Patent: Sep. 24, 2002

(54) HELICOPTER IN-FLIGHT ROTOR TRACKING SYSTEM, METHOD, AND SMART ACTUATOR THEREFOR

(75) Inventors: Dennis K. Kennedy, Mesa, AZ (US); Friedrich K. Straub, Mesa, AZ (US); Ahmed A. Hassan, Mesa, AZ (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/955,769

(22) Filed: Sep. 19, 2001

Related U.S. Application Data

(62) Division of application No. 09/518,839, filed on Mar. 3, 2000, now Pat. No. 6,322,324.

(51) Int. Cl.[7] .................................................. F01B 29/10
(52) U.S. Cl. ......................................... 60/527; 60/528
(58) Field of Search ................................... 60/527, 528

(56) References Cited

U.S. PATENT DOCUMENTS

| | | | | |
|---|---|---|---|---|
| 5,674,027 A | * | 10/1997 | Warnaar | 403/404 |
| 6,298,662 B1 | * | 10/2001 | Vezain | 60/527 |
| 6,322,324 B1 | * | 11/2001 | Kennedy et al. | 416/1 |

* cited by examiner

Primary Examiner—Hoang Nguyen

(74) Attorney, Agent, or Firm—Alston & Bird LLP

(57) ABSTRACT

A system for quasi-statically correcting tracking of rotor blades of a helicopter rotor during operation includes a trim tab mounted on each rotor blade and deflectable relative to the rotor blade so as to change a tracking path of the rotor blade, and a rotor track and balance analyzer that includes sensors for acquiring rotor tracking and balance information and is operable to process the rotor tracking and balance information so as to predetermine a new tab position to which the trim tab should be deflected for bringing the tracking path of a mistracking rotor blade into alignment with a reference path. The trim tab is deflected by an actuator mounted to the rotor blade, the actuator having an actuating element coupled with the trim tab and formed of a smart material such that the actuating element deforms proportional to a stimulus applied to the actuating element. An electrical locking device is included which is operable when de-energized to lock the trim tab against deflection, and operable when energized to unlock to permit the trim tab to be deflected. A trim actuation control system in communication with the rotor track and balance analyzer and the locking device is arranged to energize the locking device and to supply electrical power to the actuator so as to deflect the trim tab to the new tab position predetermined in the rotor track and balance analyzer, and to then de-energize the locking device and cut off the electrical power to the actuator. Thus, electrical power is supplied to the actuator only while the trim tab is being deflected, and is then discontinued once the tab has reached the desired position and the locking device has been de-energized to lock the tab against further movement.

9 Claims, 5 Drawing Sheets

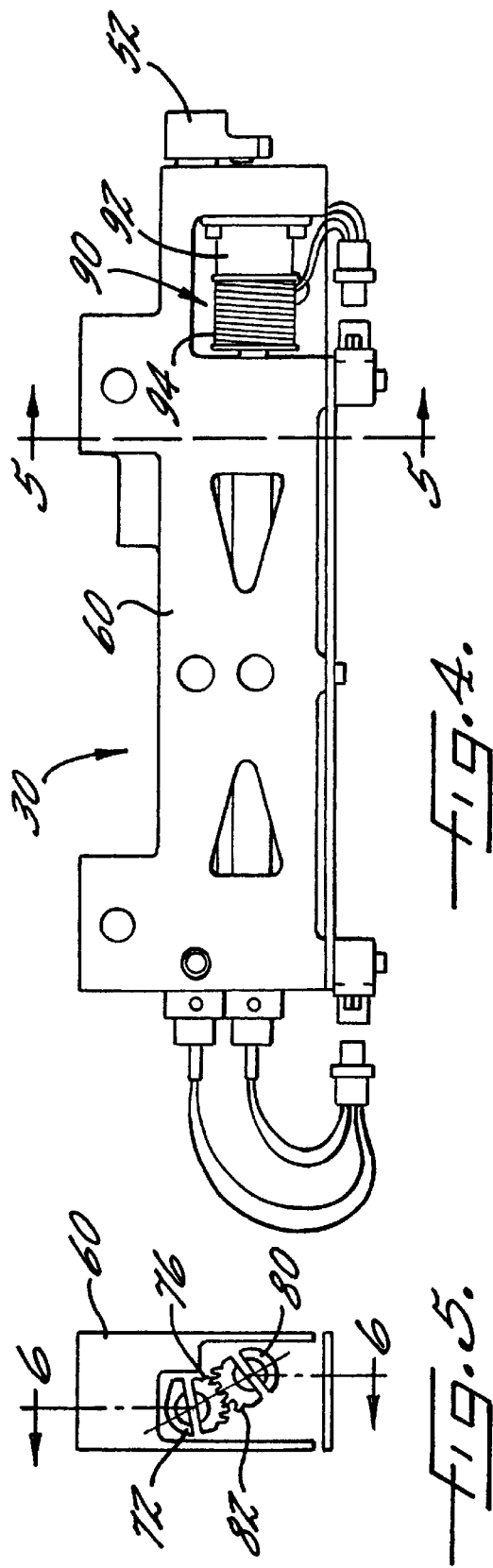
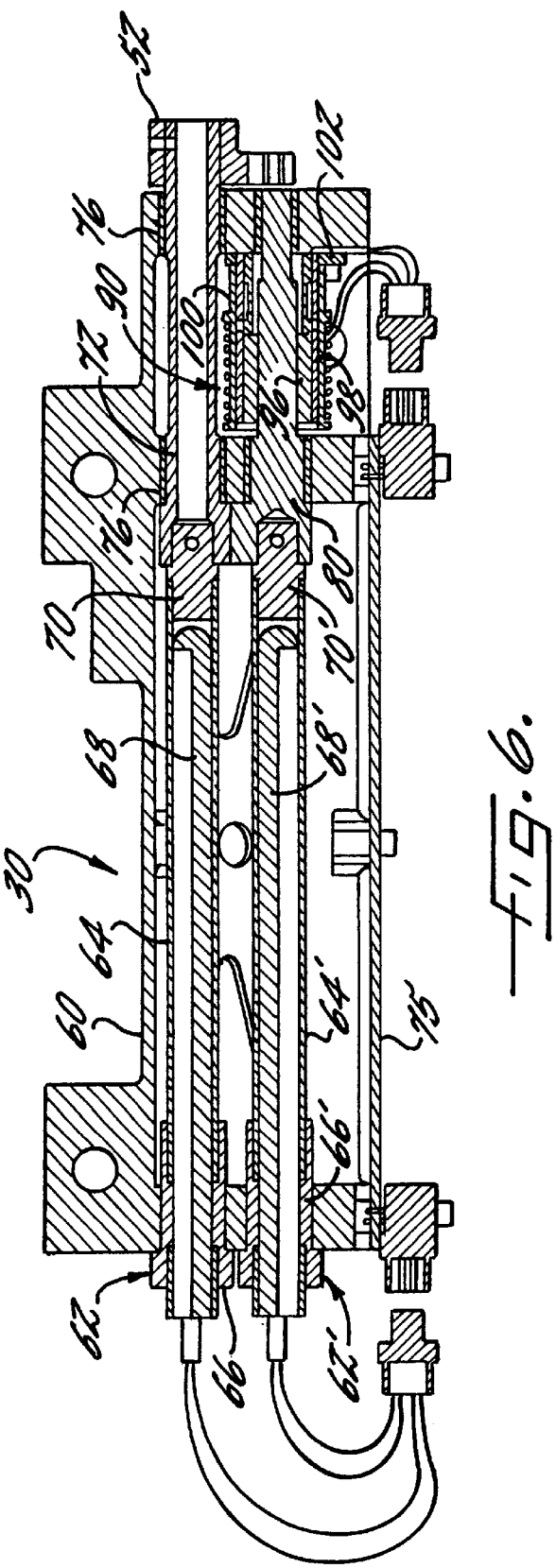

HELICOPTER IN-FLIGHT ROTOR TRACKING SYSTEM, METHOD, AND SMART ACTUATOR THEREFOR

CROSS-REFERENCE TO RELATED APPLICATION

This application is a divisional of U.S. Application No. 09/518,839, filed Mar. 3, 2000, which is hereby incorporated herein in its entirety by reference, now U.S. Pat. No. 6,322,324.

FIELD OF THE INVENTION

The invention relates generally to systems for detecting and analyzing mistracking rotor blades of a helicopter rotor and to trim tab systems used for adjusting the aerodynamic characteristics of individual rotor blades so as to correct their tracking and thereby reduce rotor vibration caused by aerodynamic unbalance of the rotor. The invention relates more particularly to systems for remotely adjusting trim tabs on rotor blades during operation of the helicopter.

BACKGROUND OF THE INVENTION

Vibration in helicopters caused by unbalance of the main rotor is a problem that has long concerned those in the helicopter field. Excessive rotor-induced vibration can shorten the life of the airframe and installed components such as avionics, and is generally annoying and uncomfortable for the crew and passengers. Helicopter rotor vibration is caused by two primary mechanisms. Inertial unbalance of the rotor is one source of rotor vibration, and results when the center of inertia does not coincide with the rotational axis of the rotor. Inertial unbalance is primarily caused by differences in mass and/or mass distribution between the rotor blades. Accordingly, it is common practice to analyze the inertial balance characteristics of helicopter rotors and to add weights to one or more of the blades so as to inertially balance the rotor. The inertial balancing operation is performed as a maintenance procedure.

Complicating the analysis of inertial unbalance is the fact that rotor vibration can also be caused by aerodynamic unbalance of the rotor, which results when the aerodynamic forces and moments acting on the rotor blades are not the same among all of the blades. This can be due, for example, to differences in blade shape, such as differences in blade twist and/or differences in airfoil shapes, from one blade to another. Such blade shape differences can cause a blade to "mistrack", i.e., to rotate in a plane that deviates from the plane in which other blades are rotating. Ideally, for minimizing aerodynamic unbalance, all blades should rotate in the same plane. Blades that deviate from this plane generate increased rotor vibration and reduced performance. Thus, it is common practice to analyze the tracking of rotor blades and to adjust any mistracking blades in some manner to bring their tracking back into alignment so that all blades track in the same plane.

It will be appreciated that in order to properly correct both inertial and aerodynamic unbalance, it is necessary to determine to what extent a detected vibration is caused by inertial unbalance and to what extent it is caused by aerodynamic unbalance. For this purpose, rotor vibration and tracking analyzers have been developed for use in maintenance procedures to correct rotor unbalance. Typically, rotor vibration and tracking analyzers are maintenance equipment items that are operated when a balancing procedure is to be performed, and are deactivated after the balancing procedure is completed. A rotor vibration and tracking analyzer obtains signals from vibration sensors placed on the rotor and/or airframe, and from a tip path plane sensor that detects to what degree a given rotor blade's tip path plane deviates from a reference plane, which is usually defined as the tip path plane of one blade designated as a "master" blade. The analyzer processes the vibration and tracking data and determines what vibration component is due to inertial unbalance and what component is due to aerodynamic unbalance. The analyzer typically also recommends corrections (e.g., addition of weights to the blade tips) that should be made to one or more identified blades to correct the inertial unbalance, and blade orientation changes that should be made to one or more identified blades to correct the aerodynamic unbalance. Thus, in conventional rotor balancing procedures, maintenance personnel use a rotor vibration and tracking analyzer to analyze the vibration and tracking data while the helicopter is operating, and then the blades are corrected as a ground maintenance operation according to the recommended corrective actions provided by the analyzer. Exemplary systems for analyzing rotor tracking data are shown in U.S. Pat. Nos. 4,531,408; 4,112,774; 4,053,123; and 3,945,256, the disclosures of which are incorporated herein by reference. Additionally, U.S. Pat. No. 3,938,762, incorporated herein by reference, describes a system for discriminating between inertial and aerodynamic unbalance forces using installed electronics with data inputs from a rotor shaft position sensor and airframe vibration sensors, and for recommending mass additions and pitch link adjustments to correct the unbalance.

Inertial unbalance is usually corrected by adding mass to the identified blade(s), as already noted. Aerodynamic unbalance is often corrected by adjusting a pitch link that is attached to the blade and provides rotor cyclic and collective pitch control through cooperation with a swashplate located at the rotor hub. The pitch link is a manually adjustable variable-length link, similar to a turnbuckle. Shortening or lengthening the pitch link by turning it one direction or the other causes the blade's pitch to be increased or decreased so that the blade tracks either higher or lower relative to the airframe. Thus, in helicopters wherein blade tracking is adjusted by adjusting the pitch link length, each mistracking blade is adjusted by turning the pitch link a number of turns from a reference position, and the number of pitch link turns is noted and is often marked on the blade.

In other types of helicopters, aerodynamic unbalance is corrected by making deflections to a trim tab that is attached to the blade, usually at the trailing edge near an outboard position. Rotor track and balance analyzers used with this type of rotor are operable to recommend the amount of angular deflection to be made to the trim tab of each mistracking blade. A maintenance person adjusts the trim tabs according to the analyzer's recommendations.

A significant drawback to the conventional maintenance-based approach to rotor balancing described above is that the rotor must be operated in a number of conditions ranging from ground run, hover, to various forward flight conditions, so that vibration and tracking data can be acquired at each condition. It will be appreciated, however, that a tracking adjustment that might be optimum in hover may very likely not be optimum in forward flight or ground run. Thus, the analyzer determines an across-the-board compromise correction that will reduce unbalance generally, but may not be optimum for some flight conditions. A further drawback of this maintenance-based approach is that it takes a great deal of time to make the initial flights for data acquisition, adjust the blades, and then make validating flights to confirm that the corrective action has produced the desired result. Yet another disadvantage is that the trim tab position that is set can wash out over time, requiring readjustment.

Accordingly, efforts have been devoted toward developing systems capable of making in-flight tracking corrections. For instance, the Kaman SH-2G Super Seasprite helicopter has the ability to perform rotor track adjustments during flight. The Seasprite employs a mechanically controlled aerodynamic servoflap to vary blade pitch, rather than the more-typical direct blade root pitch control through a swashplate and pitch link. The servoflap for each blade is attached to an electromechanical actuator in series with a link in the control system that controls the servoflap position. The electromechanical actuator acts as a variable-length link. Tracking adjustments are made to a given blade by activating the actuator for that blade to increase or decrease its length, thereby changing the pitch of the blade. A drawback to this approach is that because the tracking adjustment actuator is in the primary flight control linkage, it must react the primary flight control loads, and hence must be relatively heavy and robust.

Another helicopter having in-flight tracking adjustment capability is the Bell 214ST, which employs a conventional swashplate and pitch link control system. Similar to the Seasprite, the Bell helicopter also has a variable-length link in the primary pitch control linkage, in the form of an electromechanical device disposed between the pitch horn and pitch link. The electromechanical device is operated to incrementally adjust the pitch of the blade. Thus, this helicopter raises the same concerns as the Seasprite, in that the tracking adjustment device is in the primary flight control linkage.

It would be desirable to provide an in-flight rotor tracking adjustment system that is decoupled from the primary flight control system. One such proposed system is described in U.S. Pat. Nos. 5,752,672 issued to McKillip, Jr. The McKillip patent discloses a remotely controllable trim tab system employing a plastically deformable trim tab attached to a trailing edge of a rotor blade and integrally formed with an actuator comprising wires of shape memory alloy (SMA) material. Shape memory alloys are one class of so-called "smart" materials that deform when exposed to a stimulus such as electrical current, heat, or magnetism. An SMA material can be plastically deformed at room temperature and, when heated to a higher temperature, the material returns to its original undeformed shape. In the McKillip device, one set of SMA wires are attached between the underside of the rotor blade and the trim tab near its trailing edge, and another set of the wires are attached to the upper side of the blade and the trim tab at locations near the leading and trailing edges of the tab. Electrical current is applied to the upper set of wires to cause them to heat up and shorten so as to plastically bend the trim tab upward, and then the current is discontinued so that the SMA wires cool. The trim tab, since it was plastically deformed, is said to remain in its deformed position. Conversely, when electrical current is supplied to the lower set of wires, the trim tab is bent downwardly. A disadvantage of this system is that it is unlikely to be able to accurately make very small adjustments (e.g., on the order of 0.25 degree) in trim tab angle, since it relies on plastically deforming the trim tab. Accordingly, if the trim tab is bent within its elastic range, the SMA wires in their cooled state may not be stiff enough to hold the trim tab in the deflected position. Furthermore, it would be expected that the SMA wires would respond to temperature changes in the ambient environment and thus the trim tab position would be susceptible to drift as the ambient temperature varied. There is nothing in the McKillip device to positively assure that the trim tab is maintained in a fixed position.

A further example of a system for automatic control of blade tracking is described in U.S. Pat. Nos. 3,795,375 issued to Lemnios. The system employs a trim tab on each blade, and a small actuator mounted in each blade and connected to the trim tab. The actuator operates in response to the output of a feedback control circuit that includes vibration sensors mounted to the airframe for sensing one-per-revolution pitching moment changes caused by one or more unbalanced blades. The actuator and sensor are said to provide continuous trimming of the rotor blades. The patent does not describe an actuator capable of performing the actuation function. In the Lemnios system, a pulse output is applied to a blade determined to be unbalanced such that the actuator incrementally deflects the trim tab, and the pulse is applied at each rotation of the blade until the unbalance is corrected. The continuous tracking system described in the patent requires the trim tab position loop to be closed between the non-rotating and the rotating frames, through slip rings, since the tracking error solution is a result of incrementally deflecting the tab, analyzing the result in terms of vibration, then applying a further incremental tab adjustment, and so on until a minimum vibration level is reached. Because each blade is adjusted with each rotor rotation, this type of system requires a relatively high operating bandwidth for signal transmissions through the slip rings between the rotating and non-rotating frames. Accordingly, this high bandwidth would limit the types of actuators that could be used; for example, a DC stepping motor combined with a significant reduction drive could be used to provide actuation at such a high bandwidth. Furthermore, any actuator used in the rotor blade must be capable of withstanding the severe operating environment, in terms of very high centrifugal loads (e.g., on the order of 800 g or more) and high vibrations. A DC stepping motor or the like would be too heavy and bulky to use in this environment, and may not be rugged enough for prolonged operation under the severe use conditions. It should also be noted that Lemnios's system does not differentiate between inertial and aerodynamic unbalance.

Another patent showing a remotely controllable blade aerodynamic adjustment system is U.S. Pat. Nos. 5,224,826 issued to Hall et al. The system is said to be for automatic control of vibrations of the rotor occurring at certain multiples (higher harmonics) of the rotational frequency. The system employs a flap hinged to the blade trailing edge, and a piezoelectric actuator for deflecting the flap up or down. The actuator comprises a beam formed by a pair of plates joined together along their lengths. At least one of the plates is formed of a piezoelectric material, and preferably both plates are piezoelectric. Applying electrical potentials across the plates causes the beam to bend, which deflects the flap. A drawback of the disclosed system is that the electrical potential must be continuously applied in order to hold the flap in the deflected position.

U.S. Pat. Nos. 5,239,468 describes an automated helicopter maintenance monitoring system, also known as a health usage and monitoring system (HUMS), for collecting airframe and component maintenance data along with rotor balance and tracking data. The system does not perform in-flight corrective action functions, but rather performs diagnostic functions to determine helicopter faults and to anticipate future faults. The system stores vibration data from accelerometers mounted on the airframe adjacent the main rotor, and stores tracking data from a main rotor track sensor.

Other efforts are currently underway to develop maintenance monitoring and prediction systems, such as the program of the Rotorcraft Industry Technology Association (RITA) to develop a HUMS system including a maintenance data recorder (MDR) for acquiring and recording data to aid in evaluating the life of helicopter system components. Current military research programs are also developing a Structural Usage and Monitoring System (SUMS). The difference between HUMS and SUMS is that the HUMS system utilizes signals from existing aircraft instrumentation, such as turbine exhaust gas temperature, transmission chip detection and oil temperature, additional installed instrumentation such as accelerometers, and possible other instrumentation. In contrast, the SUMS system employs a flight regime recognition code that uses flight control positions, engine/rotor "on-off", etc., as inputs to predict component life. However, there is currently no known HUMS or SUMS system or the like that also includes an automated rotor tracking adjustment system having rotor-mounted actuators that can tolerate the severe operating conditions.

SUMMARY OF THE INVENTION

The above needs are met and other advantages are achieved by the present invention, which in one embodiment provides a system for quasi-statically correcting tracking of a rotor blade of a helicopter rotor during operation and having a trim tab actuator that can operate in the severe use conditions of a rotor blade. The system in accordance with this embodiment employs a trim tab mounted on the rotor blade and deflectable relative to the rotor blade so as to change a tracking path of the rotor blade, and a rotor track and balance analyzer that includes sensors for acquiring rotor tracking and balance information and is operable to process the rotor tracking and balance information so as to predetermine a new tab position to which the trim tab should be deflected for bringing the tracking path of the rotor blade into alignment with a reference path. The trim tab is deflected by an actuator mounted to the rotor blade, the actuator having an actuating element coupled with the trim tab and formed of a smart material such that the actuating element deforms proportional to a stimulus applied to the actuating element. Any of the known types of smart materials and actuators can be used, including shape memory alloys (including those stimulated thermally, magnetically, or by electric fields), piezoelectric materials, peristaltic actuators (e.g., "inchworm" motors), magnetostrictive elements, or the like. The actuator further includes stimulus means for applying a stimulus to the actuating element upon supplying electrical power to the stimulus means, whereby the actuator deflects the trim tab when electrical power is supplied to the actuator. Additionally, the system includes an electrical locking device operable when de-energized to lock the trim tab against deflection, and operable when energized to unlock to permit the trim tab to be deflected. The locking device can be incorporated into the actuator, if desired, and can itself utilize smart materials for accomplishing its locking and unlocking functions. The system also includes a trim actuation control system in communication with the rotor track and balance analyzer and the locking device. The trim actuation control system is arranged to energize the locking device and to supply electrical power to the actuator so as to deflect the trim tab to the new tab position predetermined in the rotor track and balance analyzer, and to then de-energize the locking device and cut off the electrical power to the actuator. The locking device fixes the trim tab in the new tab position so that electrical power is supplied to the actuator only while the trim tab is being deflected, and is then discontinued once the tab has reached the desired position and the locking device has been de-energized to lock the tab against further movement.

Preferably, deflection of the trim tab is controlled in a closed position loop by a position control unit that receives the new tab position predetermined in the rotor track and balance analyzer, and regulates the stimulus applied to the actuating element of the actuator so as to drive the tab position to the predetermined new tab position. Furthermore, it is preferred to locate the position control unit on the rotor blade, such as adjacent to the actuator, so that data communication requirements between the non-rotating and rotating frames can be reduced. For example, a predetermined new tab position can be transmitted from a trim actuation controller, which advantageously is located in the non-rotating structure of the helicopter, through a slip ring or the like to the position control unit, and then the position control unit can operate in a feedback loop to drive the trim tab to the new position without having to send or receive additional data between the non-rotating and rotating frames.

The system preferably also includes a pilot interface for use by a crew member. The interface advantageously allows a crew member to decide whether the tracking correction of the system will be performed automatically (automatic mode), or alternatively will be performed only upon activation by the crew member via the interface (pilot-in-the-loop mode). The system preferably includes a data recording device that records vibration and tracking data acquired by vibration and tracking sensors associated with the rotor track and balance analyzer. The trim actuation control system in the automatic mode is operable to periodically analyze the vibration data stored in the data recording device and compare the vibration level against a predetermined threshold; when the vibration level exceeds the threshold, the trim actuation control system automatically initiates a tracking correction procedure as described above.

In the pilot-in-the-loop mode, the pilot is involved in the process of deciding whether and when to initiate a tracking correction procedure. The pilot can initiate a tracking and balance analysis procedure, via the interface, such that the rotor track and balance analyzer acquires tracking and vibration data and sends the data to the pilot interface, where they advantageously are displayed on a display device associated with the interface. Based on the displayed data, if the pilot desires to correct the tracking of a given blade, the pilot can operate the interface to identify the blade to be corrected and to cause the trim actuation controller to correct the tracking of the identified blade. Each actuator for each blade advantageously has a unique address (e.g., a digital address), such that the trim actuation control system can supply electrical power and commanded tab position independently to each identified blade.

The invention also provides a method for correcting tracking of rotor blades during operation. The method in one embodiment comprises providing a trim tab on the rotor blade, the trim tab being deflectable relative to the rotor blade for altering a tracking path of the rotor blade; providing an actuator on the rotor blade and coupled with the trim tab for deflecting the trim tab, the actuator incorporating an electrically activatable smart material such that the actuator is activated to deflect the trim tab when electrical power is supplied to the actuator; determining a degree of mistracking of the rotor blade relative to a reference;. measuring a level of vibration induced by unbalance of the rotor; predetermining, based on the degree of mistracking and the level of vibration, a new tab position to which the trim tab should be deflected for bringing the tracking path of the rotor blade into alignment with a reference path; communicating the predetermined new tab position to a position control unit located adjacent the actuator on the rotor blade, the position control unit being operable to regulate electrical power supplied to the actuator via a position feedback loop so as to cause the actuator to deflect the trim tab to the predetermined new tab position; and supplying electrical power to the actuator through the position control unit such that the position control unit controls the actuator to deflect the trim tab to the predetermined new tab position. Thus, position feedback control of the trim tab position is performed locally on the rotor blade.

The method advantageously also includes operating a locking device located on the rotor blade or within the actuator itself so as to fix the trim tab against further deflection once the trim tab reaches the predetermined new tab position, and discontinuing electrical power to the actuator once the locking device has been operated to fix the trim tab.

In another aspect of the invention, there is provided a method for acquiring and recording tracking and vibration data for a helicopter rotor and for correcting tracking of a rotor blade of the rotor during operation, comprising: providing a trim tab on the rotor blade, the trim tab being deflectable relative to the rotor blade for altering a tracking path of the rotor blade; providing an actuator on the rotor blade and coupled with the trim tab for deflecting the trim tab, the actuator incorporating an electrically activatable element operable to deflect the trim tab when electrical power is supplied to the actuator; periodically acquiring tracking data from at least one tracking sensor operable to measure a degree of mistracking of the rotor blade relative to a reference; periodically acquiring vibration data from at least one vibration sensor mounted adjacent the rotor and operable to measure a level of vibration induced by unbalance of the rotor; storing the tracking data and vibration data in a data recording device located in the helicopter; periodically analyzing the stored data to determine whether the level of vibration indicated by the vibration data exceeds a predetermined threshold; upon determining that the level of vibration exceeds the predetermined threshold, initiating a tracking analysis procedure wherein the stored tracking and vibration data are analyzed to predetermine a new tab position to which the trim tab should be deflected for correcting the mistracking of the rotor blade so as to reduce an aerodynamically induced component of the vibration; and operating the actuator to deflect the trim tab to the predetermined new tab position.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 3 is a perspective view of one embodiment of an actuator in accordance with the invention, shown installed within a rotor blade and coupled with a trim tab;

FIG. 4 is top elevation of a trim tab actuator suitable for use in practicing the present invention;

FIG. 5 is a cross-sectional view taken on line 5—5 of FIG. 4, showing the output crank and brake shaft of the actuator;

FIG. 6 is a cross-sectional view taken on line 6—6 of FIG. 5, showing a longitudinal section through the actuator;

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
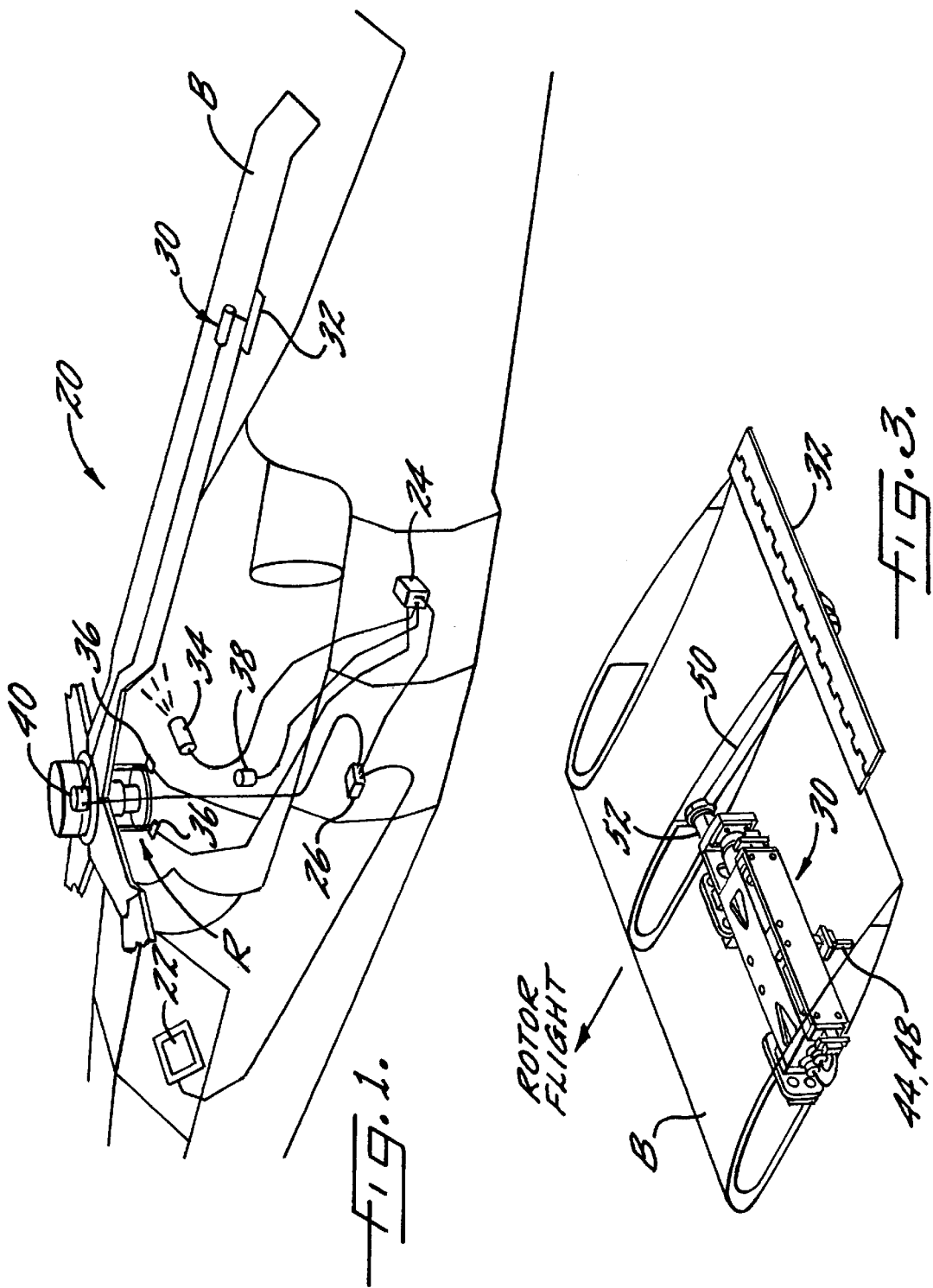
FIG. 1 is a schematic depiction of a system in accordance with one embodiment of the invention, shown installed in a helicopter.
Figure 2:
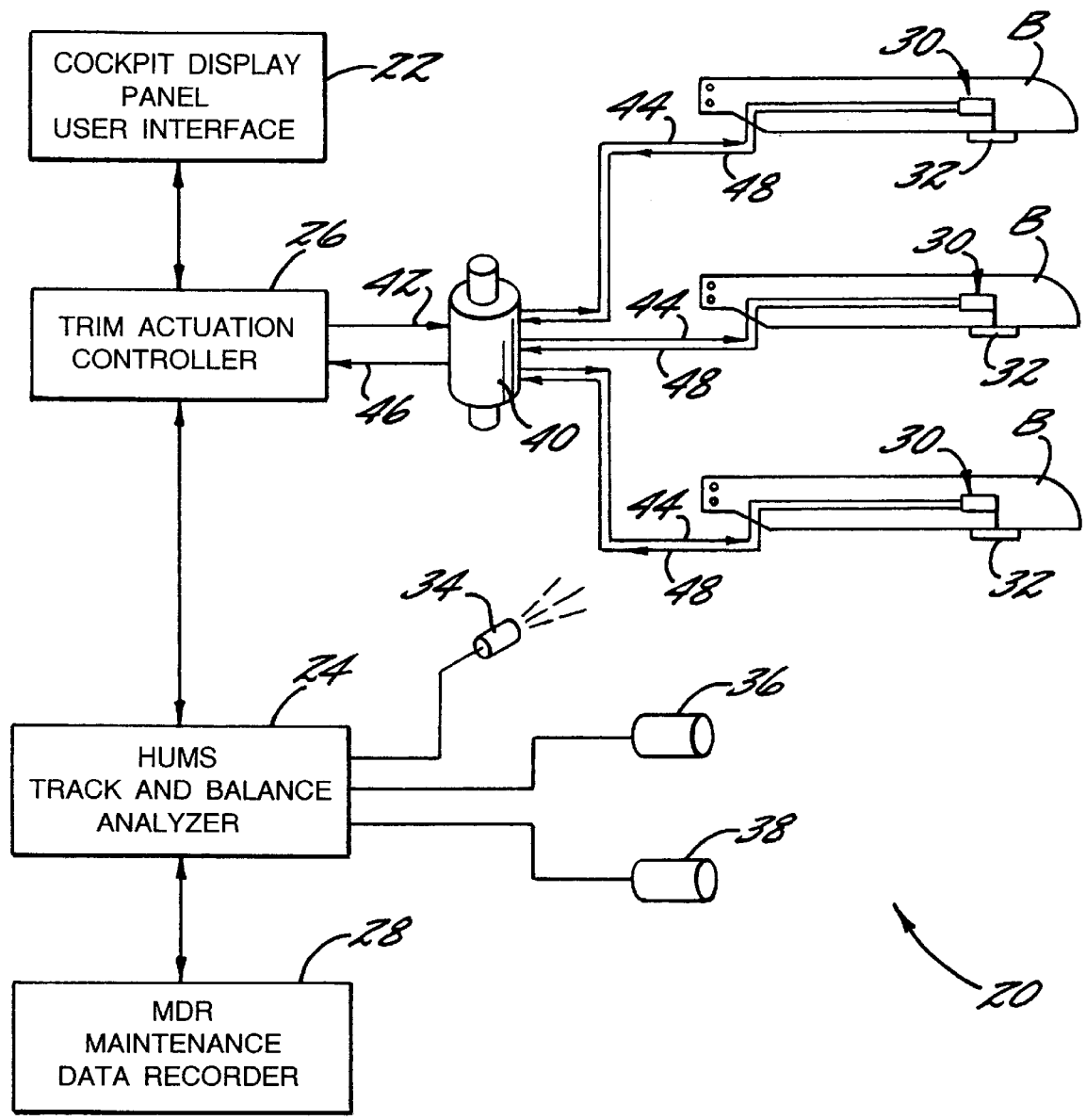
FIG. 2 is a block diagram of a system in accordance with an embodiment of the invention.
Figure 7:
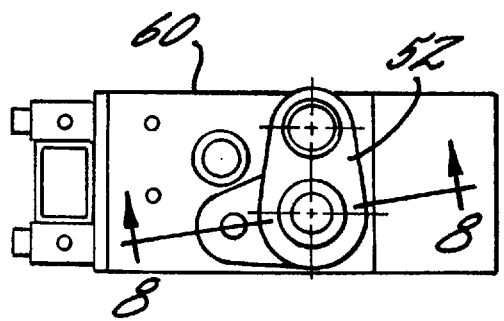
FIG. 7 is an end elevation of the actuator.

A system for in-flight rotor tracking analysis and correction in accordance with one embodiment of the invention is, shown in FIGS. 1 and 2 and is broadly designated by reference numeral 20. The major components of the system 20 include a pilot interface and display 22 located in a crew area of the helicopter, an onboard rotor track and balance analyzer 24, a trim actuation controller 26, a maintenance data recorder 28, actuators 30 mounted to the rotor blades B and mechanically coupled with trim tabs 32 movably connected to the trailing edges of the rotor blades, a tracking sensor 34, one or more vibration sensors 36, a rotor azimuth position sensor 38, and a rotating slip ring 40 mounted about the rotor shaft for transmitting power and data between the non-rotating and rotating frames. Various types of slip rings can be employed for transmitting power and/or data across the interface between the rotating and stationary frames, including contact-type slip rings and non-contacting slip rings such as inductive or optical slip rings. It should also be noted that the trim tab 32 can be attached to or integrally incorporated into the rotor blade in various ways, the important consideration being that the trim tab be deflectable relative to the remainder of the blade to cause a change in the aerodynamic loading on the blade so as to cause the tracking of the blade to change. Thus, trim tabs that are hingedly connected to the blade can be used, or trim tabs that are an integral part of the blade similar to plain flaps can be used.

The rotor track and balance analyzer 24 is connected to receive signals generated by the blade tracking sensor 34, the vibration sensors 36, and the blade azimuth position sensor 38. The analyzer 24 includes processor components programmed to analyze the tracking and vibration data and blade position signals from the sensors 34, 36, 38 and determine which of the rotor blades B are mistracking, and recommend the magnitude and direction of angular deflection of the trim tab 32 required to bring each mistracking blade back into correct tracking. Exemplary rotor track and balance systems are shown in U.S. Pat. Nos. 4,531,408; 4,112,774; 4,053,123; and 3,945,256, which have been incorporated by reference. More specifically, the vibration sensors 36 are mounted adjacent the rotor R for sensing one-per-revolution vibration of the rotor, which is indicative of a rotor unbalance condition that may be due to inertial unbalance, aerodynamic unbalance, or a combination of both. The vibration sensors 36 are advantageously accelerometers, although any type of sensor capable of measuring vibration can be used. The blade tracking sensor 34 is used for measuring a relative displacement between the plane in which a blade is rotating and a reference plane. One of the rotor blades B is designated a "master" blade, and the tracking error for the other blades is measured relative to the plane in which the master blade is rotating. Typically, the tracking sensor 34 includes a light strobe (not shown) operable to strobe at a frequency essentially matching the rotational frequency of the blades. A target (not shown) on each blade, such as a retro-reflective target (one that reflects light back to the source) usually mounted near the blade tip, reflects the light emitted by the strobe, and the synchronization of the strobe frequency with the blade rotational frequency causes the target to appear stationary. The sensor 34 also includes a detector (not shown) that captures the light reflected back from the target. The detector is operable to measure the vertical location of the target relative to the target on the master blade, and to produce an output signal indicative of this relative vertical displacement. Thus, the tracking sensor 34 provides an output signal to the rotor track and balance analyzer 24 indicating the degree of mistracking of the rotor blade. Any type of tracking sensor operable to provide such an output can be used, including those based on visible light (strobes, lasers, and the like), those based on microwaves, and others. The rotor blades are discriminated from each other by the use of the rotor azimuth position sensor 38, which measures an azimuth position of the rotor so that the output signal from the tracking sensor 34 can be sampled by the analyzer 24 at the appropriate instant in time to determine the tracking error for any given blade. The azimuth position sensor 38 may comprise, for example, an encoder or the like.

The rotor track and balance analyzer 24 processes the signals from the vibration, tracking, and azimuth position sensors and determines what component of the rotor vibration is due to inertial unbalance and what component is due to aerodynamic unbalance. The analyzer also determines which rotor blades are inertially unbalanced and recommends corrective actions to be applied to correct the unbalance, such as to add specified weight amounts to the tips of one or more blades. Furthermore, the analyzer determines which blades are mistracking and recommends corrective actions to be applied to correct the aerodynamic unbalance caused by the mistracking. In the system of the present invention, which employs deflectable trim tabs 32 mounted on the rotor blades, the corrective actions are in the form of the magnitude and direction in which the trim tab 32 on each mistracking blade should be deflected.

In helicopters having a Health Usage and Monitoring System (HUMS) or a Structural Usage and Monitoring System (SUMS), the rotor track and balance analyzer 24 can be integrated into the HUMS or SUMS unit, if desired. For example, the analyzer 24 can be implemented on one or more circuit cards that can be added to the HUMS or SUMS unit.

In the system 20 according to the present invention, the actuator 30 on a mistracking blade identified by the rotor track and balance analyzer 24 is operated to deflect the trim tab 32 on the blade to the new tab position that is predetermined in the analyzer 24 for correcting the tracking of the blade. The trim actuation controller 26 provides electrical power and command functions to the actuators 30 and acts as a central processor for data transfer between the rotor track and balance analyzer 24, the actuators 30, and the pilot interface 22. The trim actuation controller 26 can be integrated into a HUMS or SUMS unit on those helicopters so equipped. Electrical power is supplied to the actuators 30 by a power bus 42 connected between the trim actuation controller 26 and the slip ring 40, and by individual power buses 44 that extend from the slip ring 40 along each rotor blade and connect to the respective actuators 30. Data transfer from the trim actuation controller 26 to the actuators 30 is accomplished by a data bus 46 connected between the controller 26 and the slip ring 40, and by individual data buses 48 that extend from the slip ring 40 along each blade and connect to the respective actuators 30. The actuators 30, power buses 44, and data buses 48 advantageously are disposed internally within the rotor blades. Of course, it will be recognized that both power and data can be carried on the same bus, such that the buses 44 and 48 can be one and the same bus if desired.

FIG. 3 depicts one embodiment of a suitable actuator 30 for use in the system 20 of the present invention, shown installed within a rotor blade B. The actuator 30 is mechanically coupled to the trim tab 32 by a control rod or linkage 50 that extends in a generally chordwise direction and connects to the trim tab at a lower surface thereof. Movement of the linkage 50 in the chordwise direction toward the leading edge of the rotor blade causes the trim tab 32 to be pivotally deflected downward, while movement of the linkage toward the trailing edge causes the trim tab to be deflected upward. The linkage 50 is coupled at its forward end to an output crank 52 fixed to a rotatable output shaft 72 of the actuator 30. Rotation of the output shaft 72 in one direction causes the crank 52 to be rotated so as to move the linkage 50 to deflect the trim tab upwardly; rotation in the opposite direction causes the linkage to deflect the trim tab downwardly.

The actuator 30 advantageously provides its motive force through the action of a pair of torsion tubes formed of a shape memory alloy. Thus, by electrically heating one of the torsion tubes, the tube twists and causes the output crank 52 to be rotated in one direction; by heating the other tube, it twists and causes the output crank to rotate in the opposite direction. The actuator 30 also includes an electrically operable locking device 90 that is arranged such that when electrical power is not supplied to the locking device it prevents the output crank 52 from rotating. Advantageously, the locking device itself can employ shape memory alloy materials.

More specifically, the actuator 30 and components thereof are shown in greater detail in FIGS. 4 through 10. The actuator has a housing 60 that encloses the shape memory alloy torsion tubes and the locking device 90. An output torsion tube assembly 62 (shown in isolation in FIG. 9) is mounted in the housing 60, and includes a torsion tube 64 formed of a smart material, advantageously shape memory alloy. The torsion tube 64 is fixedly mounted in a torsion coupler 66 that is fixedly mounted in the housing 60 at one end thereof. A cartridge heater 68 is disposed in the interior of the torsion tube 64, extending along the length thereof. At the opposite end of the torsion tube 64 from the torsion coupler 66, the torsion tube 64 is attached via a coupler 70 to an output shaft 72 (shown in isolation in FIG. 10). The output torsion tube assembly 62 includes a temperature sensor 74, such as a thermistor, attached to the outer surface of the tube for measuring the tube temperature, which can be used to control positioning of the trim tab based on a correlation between tube temperature and output crank or tube twist angle. The leads for the temperature sensor 74 extend through holes in the torsion coupler 66 into the interior thereof, and out the end of the torsion coupler. Position control electronics, advantageously in the form of a printed circuit board 75, are mounted on the housing 60 for coordinating the activity of the actuator 30; more particularly, the position control electronics coordinate the sequence of operations between the torsion tube assemblies 62, 62' and the locking device 90.

The output shaft 72 is rotatably mounted in a pair of bushings 76 mounted in the housing 60. The output shaft 72 has a free end that extends out the end of the housing opposite from the end with the torsion coupler 66, and the output crank 52 is attached to this free end of the shaft. Thus, when the cartridge heater 68 is energized, the torsion tube 64 heats up and twists, causing the output shaft 72 to rotate the output crank 52 in one direction so as to deflect the trim tab 32 in one direction.

Figure 8:
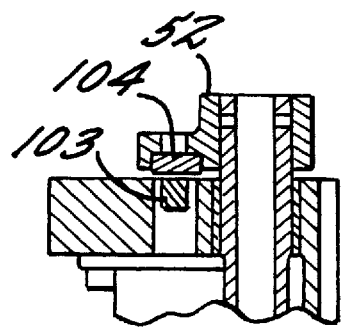
FIG. 8 is a cross-sectional view taken on line 8—8 of FIG. 7.
Figure 9:
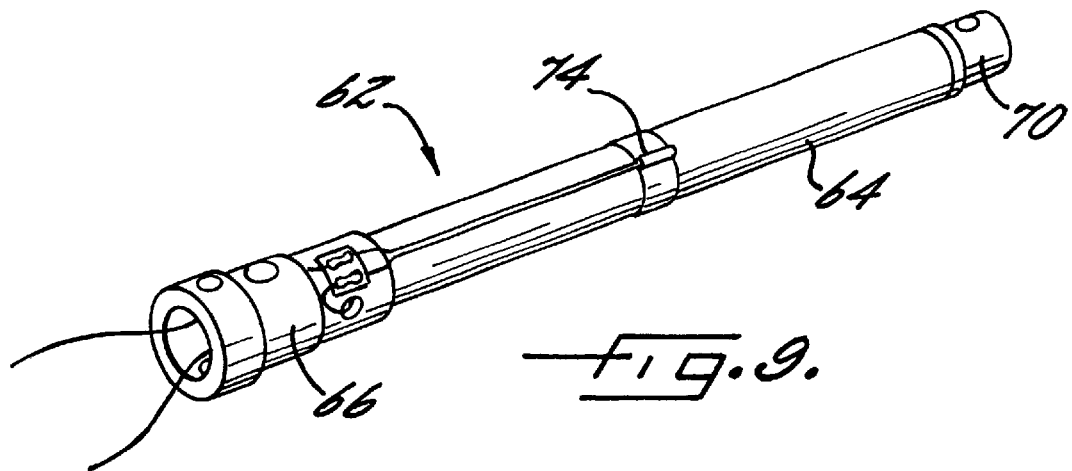
FIG. 9 is a perspective view of the torsion tube assembly of the actuator.
Figure 10:
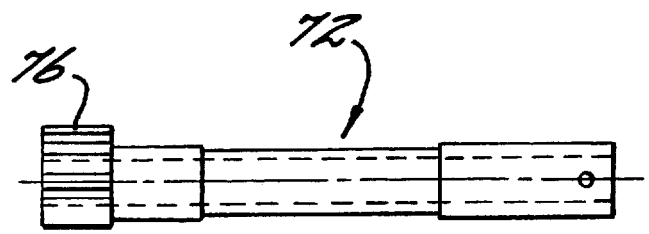
FIG. 10 is an elevation of an output shaft of the actuator.
Figure 12:
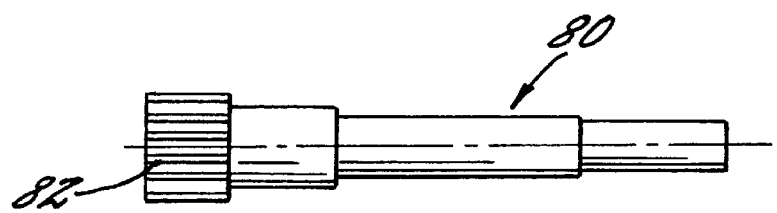
FIG. 12 is an elevation of a brake shaft for the locking system.

The actuator 30 also includes a second torsion tube assembly 62' generally similar to the first torsion tube assembly 62 described above. The second torsion tube assembly 62' includes a torsion tube 64' mounted at one end in a torsion coupler 66', and having a cartridge heater 68' therein. The opposite end of the torsion tube 64' is attached by a coupler 70' to a brake shaft 80 (shown in isolation in FIG. 12). The brake shaft 80 includes an integral toothed gear portion 82 at its end nearest the torsion tube 64'. The output shaft 72 also includes an integral toothed gear portion 76 at its end nearest the torsion tube 64, and the two gear portions 76 and 82 are meshed with each other as best seen in FIG. 5. Accordingly, when the first torsion tube assembly 62 is inactivated and the second torsion tube assembly 62' is activated by energizing the cartridge heater 68', the torsion tube 64' rotates in the same sense that the torsion tube 64 rotates when it is activated, but because of the meshing engagement between the brake shaft 80 and the output shaft 72, the output shaft 72 is cause to rotate in an opposite direction to the torsion tube 64'. In this manner, the output crank 52 is rotated so as to deflect the trim tab 32 in the opposite direction. As shown in FIG. 8, the actuator includes a. position sensor 103 mounted in the housing adjacent to the output crank 52 for sensing the position of the crank 52. The signal from the position sensor 103 is used by the control electronics 75 so that the controller knows where the actuator is positioned relative to a suitable reference. The position sensor 103 advantageously comprises a proximity sensor that senses proximity of a magnet 104 that is mounted in the output crank 52 facing the sensor 103. Proximity sensors of suitable types are well known and hence are not described in further detail.

Figure 11:
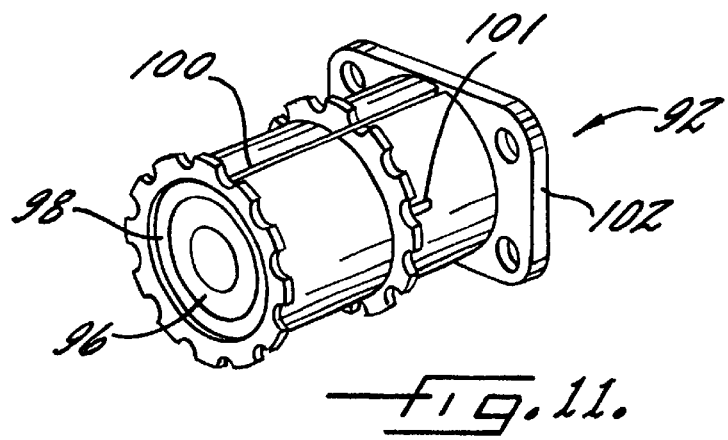
FIG. 11 is a perspective view of a brake assembly for the locking system of the actuator.

The locking device 90 for the actuator is mounted about the brake shaft 80 so as to prevent it from rotating even if either of the torsion tube assemblies is activated. The locking device 90 comprises a brake assembly 92 (FIG. 11) and a heater 94 that encircles the brake assembly 92. The brake assembly 92 comprises an active brake member or brake liner 96 that is fitted about the brake shaft 80, a passive spring member also referred to herein as a brake bias spring 98 fitted about the brake liner 96, and a brake heater bobbin 100 fitted about the brake bias spring 98. A mounting flange 102 is affixed to one end of the brake bias spring 98 and is fixedly mounted on the end wall of the actuator housing 60 so as to prevent the brake assembly 92 from rotating. The heater 94 comprises a resistance heater wire encircling the brake bias spring 98 mounted on the split bobbin 100. The brake liner 96 is formed of a shape memory alloy or other smart material designed to cause the brake liner 96 to expand radially outwardly when heated or otherwise activated. The brake liner 96 can be formed, for example, of a thermally activated SMA material, or a magnetically activated SMA material (i.e., a ferromagnetic SMA material). A thermally activated brake liner 96 is depicted. The brake liner 96 is sized relative to the brake bias spring 98 such that the brake liner 96 is interference fit in the brake bias spring 98 when assembled during manufacturing. The brake bias spring 98 is a continuous ring preferably formed of a super-elastic shape memory alloy surrounding the brake liner 96. The brake bias spring 98 acts to restore the interference condition between the brake liner 96 and brake shaft 80 by squeezing the brake liner 96 upon cooling. The brake assembly 92 includes a temperature sensor 101, such as a thermistor, attached to the outer surface of the brake liner 96 for measuring the brake temperature, which is used to control opening of the locking device 90 based on brake temperature. The brake liner 96 and bias 98 are sized relative to each other and to the brake shaft 80 such that at low temperatures (i.e., when the heater 94 is inactivated), the brake bias spring 98 is interference fit about the brake liner 96, which is interference fit about the brake shaft 80. Thus, when the heater 94 is not energized, the brake shaft 80 is prevented from rotating by the brake assembly 92. When the heater 94 is energized, the brake bias spring 98 and brake liner 96 expand radially outwardly, thereby relieving the interference fit with the brake shaft 80, allowing the brake shaft 80 to rotate.

Accordingly, when the locking device 90 is deactivated, the output crank 52 is locked and thus the trim tab 32 is locked. In order to allow the output crank 52 to be rotated, the locking device 90 is activated. Then, depending on which direction the trim tab 32 is to be deflected, either the first torsion tube assembly 62 is activated or the second torsion tube assembly 62' is activated. Once the trim tab 32 reaches its desired position, the locking device 90 is deactivated to lock the actuator 30, and thus the trim tab 32, in position. Once the locking device has locked the actuator, the actuator can be deactivated. The system of the invention thereby provides a significant advantage in that power supply to the actuator is required only during the time the trim tab is being deflected to a new position.

The illustrated actuator 30 includes two active torsion tubes 64, 64'. An actuator in accordance with the present invention can also employ a single active torsion tube formed of a smart material such as SMA, with the other active torsion tube being replaced by a passive torsion spring for providing the restoring force in the direction opposite to the direction of actuation of the torsion tube. The torsion spring can be formed, for example, by a torsion rod formed of a material with a high spring constant such as a super-elastic shape memory alloy material. Thus, the invention is not limited to actuators employing two active torsion tubes formed of smart materials.

Figure 13:
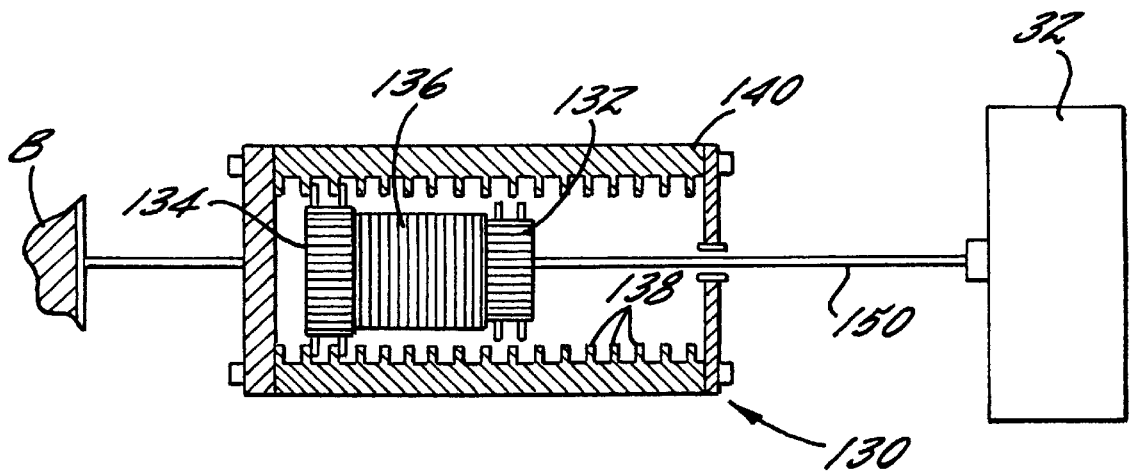
FIG. 13 is a diagrammatic plan view of an actuator and trim tab system in accordance with an alternative embodiment of the invention employing an inch-worm actuator.

As noted above, the invention can also be used with other types of actuators in addition to those based on shape memory alloy materials, including inch-worm motors of various types. As an illustrative example, FIG. 13 depicts an alternative embodiment of the invention employing an actuator 130 comprising a piezoelectric inch-worm motor. The actuator is fixed to suitable rotor blade structure such as the aft spar and extends along a chordwise direction of the blade toward the trailing edge thereof, where a pivotal trim tab 32 is attached to the blade. The actuator 130 depicted in FIG. 13 is but one example of an inch-worm motor that can be used; any inch-worm or other type of linear actuator based on smart materials can be used in the installation shown, the important consideration being that the motor provide a linear output so as to move a linkage 150 fore and aft in the chordwise direction. In the illustrated type of inch-worm motor, a pair of piezoelectric (PZT) sections 132 and 134 are connected at opposite ends of a piezoelectric extender 136. The PZT sections 132, 134 expand radially outwardly when a voltage potential is applied across them so as to engage projections or elements 138 formed on the inner wall of the actuator housing 140, which locks them in position axially. The PZT extender 136 expands axially when a voltage potential is applied to it. Thus, the actuator 130 extends by deactivating the PZT section 132 and activating the PZT section 134 and the extender 136 so that the section 132 is advanced axially, and then activating the section 132 to lock it in position and subsequently deactivating the extender 136 and the section 134 such that the extender contracts axially and draws the section 134 toward the section 132. This same process is repeated over and over, such that the section 132 is incrementally advanced in the axial direction in an inch-worm fashion. To retract the actuator, the process is reversed so that the section 132 is locked and the section 134 is unlocked when the extender 136 is expanding. In this manner, the linkage 150 can be moved aft or forward so as to deflect the trim tab 32 in one direction or the other. It will be noted that the actuator 130 and similar types of inch-worm motors have a locking mechanism integrated into the actuator, in this case in the form of the sections 132 and 134.

From the foregoing description of certain embodiments of the invention, it will be recognized that the invention offers a number of advantages over prior trim control systems for rotor blades. The actuator 30 based on smart materials is light in weight, small in size, has few moving parts, and is structurally rigid. When constructed with SMA materials, the actuator can operate on low-voltage power supplies such as 28-volt systems commonly used on aircraft, and the actuator consumes very little power. Additionally, the actuator has a slow response time and is not affected by normal cyclic pitch changes of the rotor blade. The performance of the actuator is not affected by the once-per-revolution cyclic aerodynamic forces on the trim tab because of the high actuation stiffness and inherent damping characteristics of the shape memory alloy material. The actuator is able to tolerate and function under the high G-field and vibratory environment of a rotor blade.

Many modifications and other embodiments of the invention will come to mind to one skilled in the art to which this invention pertains having the benefit of the teachings presented in the foregoing descriptions and the associated drawings. For instance, although actuators based on shape memory alloy and piezoelectric materials have been described, the invention is not limited to these types of smart materials, and actuators based on other smart materials could alternatively be used, including motors based on magnetostrictive materials, materials activated by exposure to electric fields, or the like. It should also be noted that the locking device and the actuator referred to in the-following claims can be one and the same device, as described for instance in connection with the inch-worm motor of FIG. 13. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A smart-material actuator, comprising:
   at least one active torsion element formed of a smart material that deforms in response to an applied stimulus so as to cause the torsion element to twist about an axis;
   stimulus means operable to apply a stimulus to the active torsion element;
   a shaft coupled with the torsion element so as to be rotated about a longitudinal axis of the output shaft when the torsion element twists; and
   a locking device operable to engage the shaft and prevent rotation thereof, the locking device being fixed against rotation and encircling the shaft, the locking device being formed of a smart material that deforms in response to an applied stimulus and being fitted about the shaft so as to frictionally grip the shaft to prevent rotation thereof when no stimulus is applied to the locking device, the locking device being operable to release the grip on the shaft and permit rotation thereof when a predetermined stimulus is applied to the locking device.

2. The actuator of claim 1, further comprising a torsion member for providing a restoring force to the active torsion element in a direction opposite to that in which the active torsion element rotates when stimulated by the stimulus means.

3. The actuator of claim 2, wherein the torsion member comprises a second active torsion element formed of a smart material that deforms in response to an applied stimulus, and further comprising a second stimulus means for applying a stimulus to the second active torsion element, the two active torsion elements being mechanically coupled so as to counteract each other's rotation.

4. The actuator of claim 1, wherein the active torsion element comprises a torsion tube formed of a smart material comprising one of a thermally activated shape memory alloy and a ferromagnetic shape memory alloy.

5. The actuator of claim 4, wherein the locking device includes an active brake member formed of a smart material comprising one of a thermally activated shape memory alloy and a ferromagnetic shape memory alloy, the active brake member frictionally gripping the shaft to prevent rotation thereof and releasing the grip on the shaft when stimulated, and further comprising a stimulus means for stimulating the active brake member.

6. The actuator of claim 5, wherein the locking device further includes a passive spring member engaged with the active brake member so as to providing a restoring force urging the active brake member to frictionally grip the shaft to prevent rotation thereof.

7. The actuator of claim 6, wherein the active brake member and passive spring member are formed as tubular members disposed one within the other and surrounding the shaft, the passive spring member comprising a super-elastic shape memory alloy material.

8. The actuator of claim 6, wherein the active torsion element comprises a thermally activated shape memory alloy material and the stimulus means for applying a stimulus to the active torsion element comprises a heater, and further comprising a temperature sensor for sensing a temperature of the active torsion element, a position sensor for detecting a position of the active torsion element, and a controller for regulating the heater based on the temperature sensed by the temperature sensor and the position detected by the position sensor.

9. The actuator of claim 8, wherein the active brake member comprises a thermally activated shape memory alloy material and the stimulus means for applying a stimulus to the active brake member comprises a heater, and further comprising a temperature sensor for sensing a temperature of the active brake member, the controller regulating the heater of the locking device based on the temperature sensed by the temperature sensor for the active brake member.

* * * * *